(12) United States Patent
Sun et al.

(10) Patent No.: US 7,661,659 B2
(45) Date of Patent: Feb. 16, 2010

(54) SWING-TYPE SUBMERSIBLE FLOATING AERATOR

(76) Inventors: Shulin Sun, No. 139 Hongfa Road, Zoucheng Economic Development District, Zoucheng (CN) 273500; Jian Sun, No. 139 Hongfa Road, Zoucheng Economic Development District, Zoucheng (CN) 273500

( * ) Notice: Subject to any disclaimer, the term of this patent is extended or adjusted under 35 U.S.C. 154(b) by 85 days.

(21) Appl. No.: 12/144,625

(22) Filed: Jun. 24, 2008

(65) Prior Publication Data
US 2009/0256269 A1    Oct. 15, 2009

(30) Foreign Application Priority Data
Apr. 9, 2008    (CN)    ............ 2008 1 0089642

(51) Int. Cl.
*B01F 3/04*    (2006.01)
(52) U.S. Cl. .............. 261/87; 210/242.2; 261/93; 261/120; 261/DIG. 47; 415/7; 415/115
(58) Field of Classification Search .............. 261/87, 261/91, 93, 120, DIG. 47; 210/242.1, 242.2; 310/89; 415/7, 115, 170, 230; 416/85
See application file for complete search history.

(56) References Cited

U.S. PATENT DOCUMENTS

| | | | | |
|---|---|---|---|---|
| 2,801,083 A * | 7/1957 | Balassa | ............ | 366/76.1 |
| 3,796,417 A * | 3/1974 | Kaelin | ............ | 261/93 |
| 3,823,923 A * | 7/1974 | Chapsal | ............ | 261/93 |
| 4,139,579 A * | 2/1979 | Blum | ............ | 261/29 |
| 4,242,289 A * | 12/1980 | Blum | ............ | 261/93 |
| 4,308,221 A * | 12/1981 | Durda | ............ | 261/87 |
| 4,618,426 A * | 10/1986 | Mandt | ............ | 210/620 |
| 4,732,682 A * | 3/1988 | Rymal | ............ | 210/620 |
| 4,774,031 A * | 9/1988 | Schurz | ............ | 261/87 |
| 4,954,295 A * | 9/1990 | Durda | ............ | 261/16 |
| 5,183,596 A * | 2/1993 | Rajendren et al. | ............ | 261/93 |
| 5,744,072 A * | 4/1998 | Karliner | ............ | 261/87 |
| 5,762,833 A * | 6/1998 | Gross et al. | ............ | 261/93 |
| 5,851,443 A * | 12/1998 | Rajendren | ............ | 261/87 |
| 6,126,150 A * | 10/2000 | Van Dyk | ............ | 261/87 |
| 6,860,474 B2 * | 3/2005 | Blakley et al. | ............ | 261/87 |
| 7,172,177 B2 * | 2/2007 | Durda | ............ | 261/28 |
| 2004/0130042 A1 * | 7/2004 | Blakley et al. | ............ | 261/87 |
| 2005/0263913 A1 * | 12/2005 | Rajendren | ............ | 261/93 |
| 2006/0087047 A1 * | 4/2006 | Mathur et al. | ............ | 261/93 |
| 2007/0035045 A1 * | 2/2007 | Henley | ............ | 261/87 |

FOREIGN PATENT DOCUMENTS

JP    4-78492 A *    3/1992    ............ 261/87

* cited by examiner

*Primary Examiner*—Richard L Chiesa
(74) *Attorney, Agent, or Firm*—Matthias Scholl P.C.; Matthias Scholl

(57) ABSTRACT

A swing-type submersible floating aerator, including a gas-ring compressor, a base, a pipe, a support tube, a swing device and a driving device, wherein the base is disposed between the gas-ring compressor and the support tube, the base is disposed at the center of the swing device, and the driving device drives the swing device to rotate. The swing-type submersible floating aerator is capable of rotating 360 degrees in a clockwise or a counterclockwise direction, and push-flow and aeration can be performed in any direction.

17 Claims, 5 Drawing Sheets

SWING-TYPE SUBMERSIBLE FLOATING AERATOR

CROSS-REFERENCE TO RELATED APPLICATIONS

This application claims priority benefits to Chinese Patent Application No. 200810089642.8 filed on Apr. 9, 2008, the contents of which are incorporated herein by reference.

BACKGROUND OF THE INVENTION

1. Field of the Invention

The invention relates to a submersible floating aerator, and particularly to a swing-type submersible floating aerator capable of rotating 360 degrees.

2. Description of the Related Art

Liquid aeration is used in the treatment of liquids for the purpose of mixing in air and increasing the dissolved oxygen (DO) content of liquids. When liquid aeration is used as part of wastewater treatment, bacteria and other microorganisms are usually added to the liquid to break down organic matter in the wastewater. In other applications, aeration processes are used in the treatment of water to meet the dissolved oxygen requirements for supporting fish and other aquatic organisms, for example, in aquaculture.

Conventionally, apparatuses used for liquid aeration include surface aerators, diffuser/blowers, and rotor aerators. Surface aerators pump water upward and force it into the air. They require high horsepower and consume high amounts of energy to pump liquids against gravity. In blower/diffuser systems, compressed air is introduced through diffusers at the bottom of a basin. Relatively high power is required to pressurize atmospheric air to overcome the liquid head resistance. Oxygen rises vertically and escapes quickly before effectively dispersing into the liquid. Rotor aerators consist of rotating aerators positioned at the surface of the liquid receiving treatment. Rotor systems have been known to be expensive to maintain and are high in energy consumption. They throw liquid into the air, creating aerosol that releases malodors. Rotor systems are often used in oxidation ditch applications.

Applications of the above-described aerators are very limited, and aeration and push-flow can only be performed in a fixed direction, which cause inadequate dissolved oxygen content and therefore a 'dead zone' in an oxidation ditch with a wide channel. Conventionally, this insufficiency requires more aerators oriented in different directions in a large circular aeration tank. Moreover, the depth of aeration is limited and often unacceptable.

SUMMARY OF THE INVENTION

In view of the above-described problems, it is one objective of the invention to provide a swing-type submersible floating aerator that features large aeration depth, push-flow, and multidirectionality.

To achieve the above objectives, in accordance with one embodiment of the invention, provided is a swing-type submersible floating aerator, comprising a gas-ring compressor, a base, a pipe, a support tube, a swing device, and a driving device, wherein the base is disposed between the gas-ring compressor and the support tube, the base is disposed at the center of the swing device, and the driving device drives the swing device to rotate.

In certain classes of this embodiment, the swing device comprises swing bearing, a speed reducer having a shaft, a bridge, and a fixed seat disposed on the bridge.

In certain other classes of this embodiment, the swing bearing comprises an inner ring, an outer ring, and a steel ball connected therebetween.

In certain other classes of this embodiment, a gear is disposed on the shaft of the speed reducer, and the gear is engaged with the outer ring.

In certain other classes of this embodiment, the driving device is disposed on the base, the base is disposed on the inner ring of the swing bearing, and the outer ring of the swing bearing is disposed on the fixed seat, and engaged with the driving device.

In certain other classes of this embodiment, the driving device is disposed on the fixed seat, the driving device comprises a motor and a driving wheel, the inner ring is disposed on the fixed seat, and the outer ring is disposed on the base, and abuts against the driving wheel.

In certain other classes of this embodiment, the swing-type submersible floating aerator further comprises a propeller assembly comprising a rotary lobed duct and a propeller.

In certain other classes of this embodiment, the swing-type submersible floating aerator further comprises a submersible hollow shaft motor connected to an end of the pipe.

In certain other classes of this embodiment, the swing-type submersible floating aerator further comprises an electric slip ring.

In certain other classes of this embodiment, an end of the electric slip ring is fixed to the gas-ring compressor, the electric slip ring is concentric with the swing bearing, so that a first leader cable of the submersible hollow shaft motor, a second leader cable of the gas-ring compressor, a third leader cable of the driving device, and a fourth leader cable connected to a main power supply can swing freely.

In certain other classes of this embodiment, a shaft of the submersible hollow shaft motor is hollow, a lower shaft extension of the shaft is coaxially connected to the propeller assembly, and the submersible hollow shaft motor is connected to the bottom of the support tube via a connecting bracket.

In certain other classes of this embodiment, the propeller comprises a hub and three blades; the rotary lobed duct comprises a rotary lobed nozzle, a mixing duct and a center cone, the rotary lobed nozzle is connected to the propeller; and the rotary lobed duct rotates along with the propeller under the driving of the shaft.

In certain other classes of this embodiment, a tie rod is disposed in the vicinity of the support tube; the top of the tie rod is connected to the base; and the bottom of the tie rod is connected to the connecting bracket.

In certain other classes of this embodiment, the swing-type submersible floating aerator further comprises an electric slip ring.

In certain other classes of this embodiment, the swing-type submersible floating aerator further comprises a raincover disposed at the top and having a raincover support.

In certain other classes of this embodiment, the bottom of the raincover support is connected to the fixed seat.

In certain other classes of this embodiment, a stiffener is disposed between the support tube and the base.

Advantages of the invention are:
1. The swing device comprising the swing bearing, the speed reducer and the gear enables the swing-type submersible floating aerator to rotate 360 degrees in a clockwise or a counterclockwise direction, and push-flow and aeration can be performed in any direction.

2. The swing bearing that bears with axial force, radial force and turnover torque enables the swing-type submersible floating aerator to eliminate counterforce generated by the propeller and turnover torque acting thereon, assuring stable operation of the swing-type submersible floating aerator during swinging is guaranteed.

DETAILED DESCRIPTION OF THE INVENTION

Detailed description will be given below with reference to the accompanying drawings.

Figure 1:
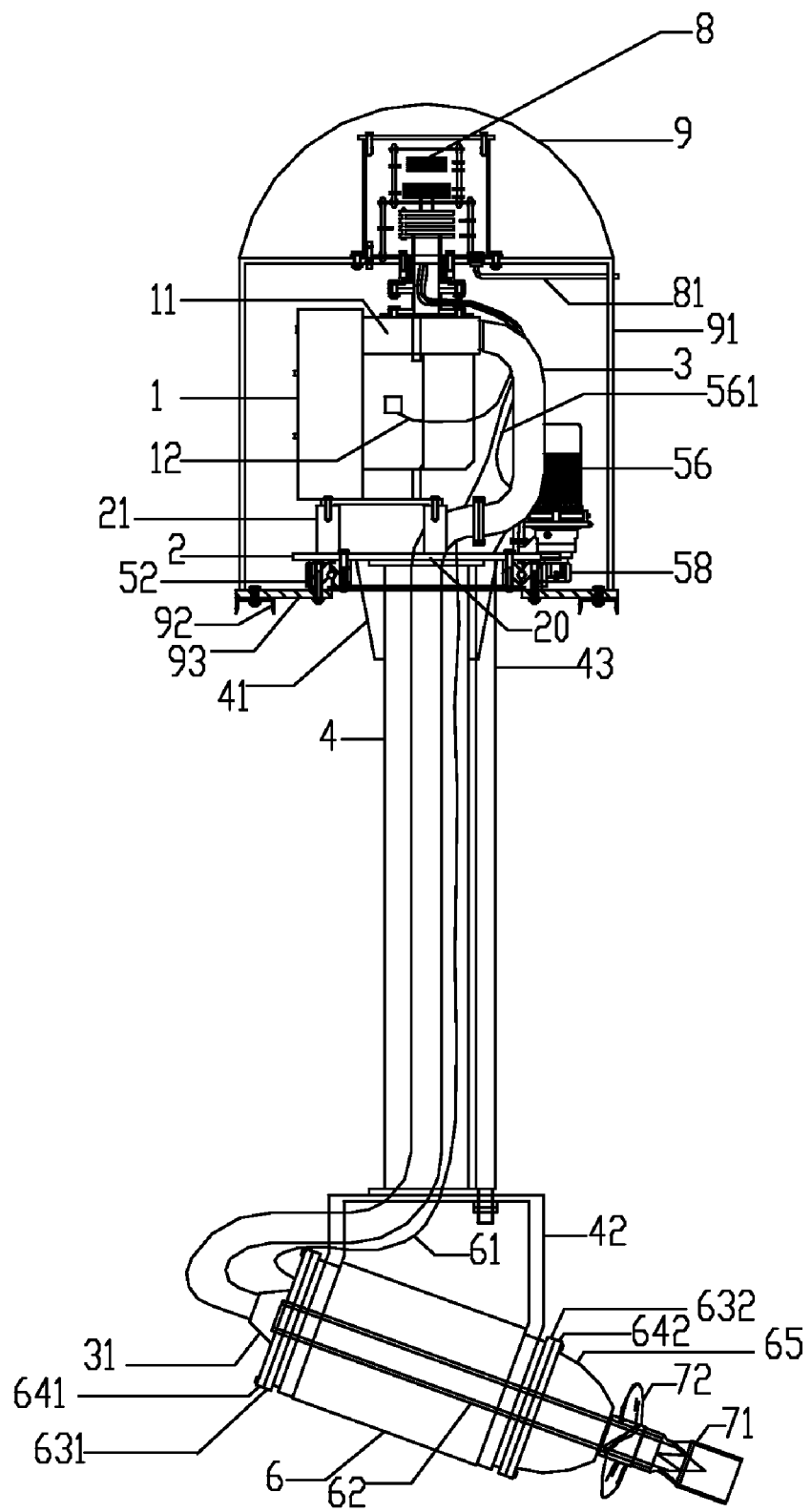
FIG. 1 is a schematic diagram of a swing-type submersible hollow shaft motor according to one embodiment of the invention.

As shown in FIG. 1, a swing-type submersible floating aerator of the invention comprises a gas-ring compressor 1, a base 2, a pipe 3, a support tube 4, a submersible hollow shaft motor 6, an electric slip ring 8, a propeller assembly, a dome 65, a first flange 641, a second flange 642, and a swing device.

The gas-ring compressor 1 is fixed to the base 2 via a bracket 21. An air inlet opening 20 is disposed on the base 2. One end of the pipe 3 is connected to an air outlet opening 11 of the gas-ring compressor 1, and passes through the air inlet opening 20 and the support tube 4, and the other end of the pipe 3 is connected to the first flange 641 via a concentric reducer 31.

The submersible hollow shaft motor 6 comprises a first motor flange 631 and a second motor flange 632 disposed on both ends thereof, along with a shaft 62. The first flange 641 is connected to the submersible hollow shaft motor 6 via the first motor flange 631, and the second motor flange 632 is connected to the dome 65 via the second flange 642.

The propeller assembly comprises a rotary lobed duct 71 and a propeller 72.

The shaft 62 of the submersible hollow shaft motor 6 is hollow, and operates as a channel for transmitting gas or liquid. A lower shaft extension of the shaft 62 is coaxially connected to the propeller assembly.

The top of the support tube 4 is jointly connected to the base 2, and the bottom of the support tube 4 is connected to the submersible hollow shaft motor 6 via a connecting bracket 42.

One end of the electric slip ring 8 is fixed to the gas-ring compressor 1.

A tie rod 68 is disposed in the vicinity of the support tube 4. The top of the tie rod 68 is connected to the base 2, and the bottom of the tie rod 68 is connected to the connecting bracket 42. A stiffener 41 is disposed between the support tube 4 and the base 2.

Figure 2:
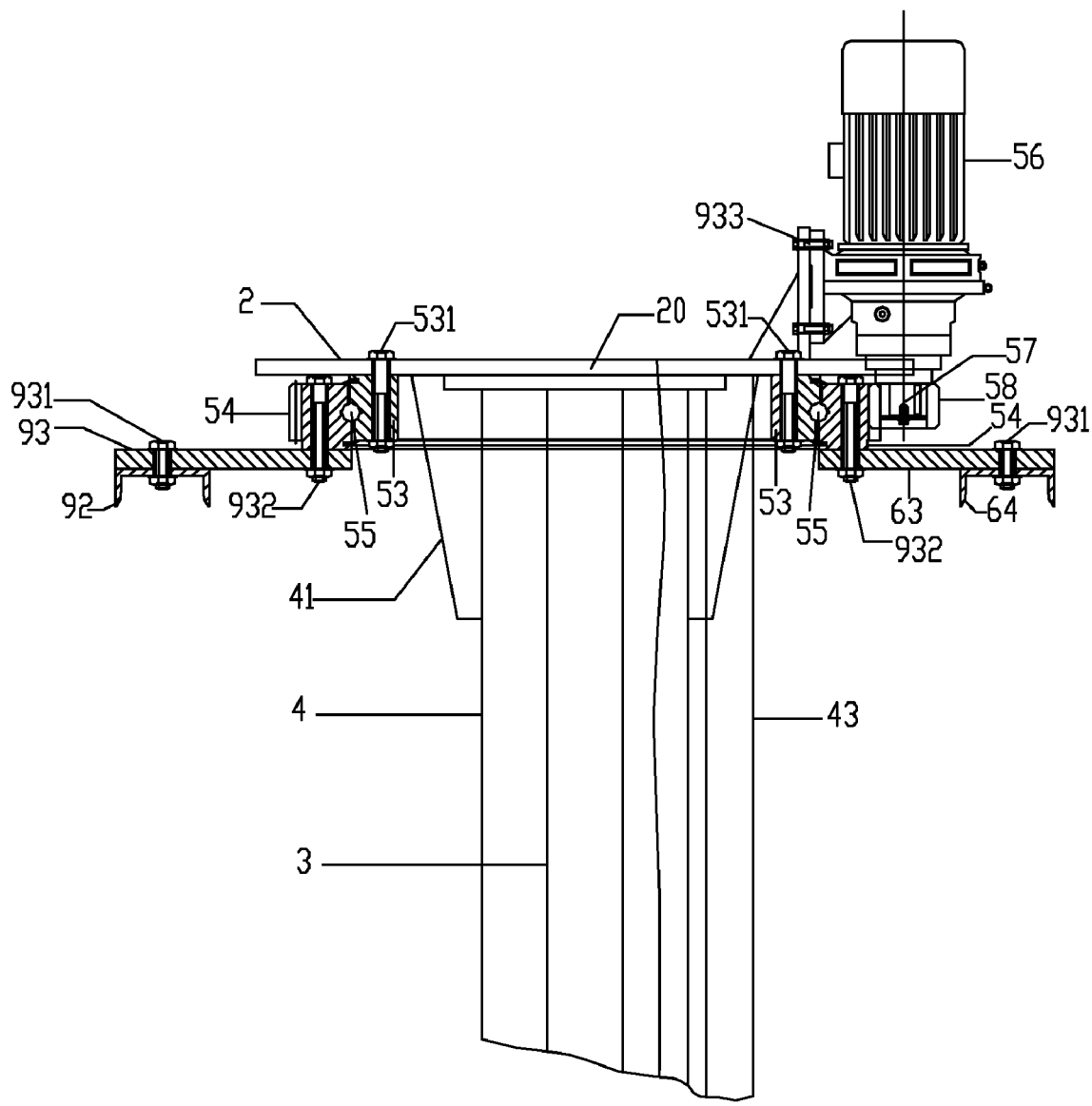
FIG. 2 illustrates a swing device according to one embodiment of the invention.
Figure 3:
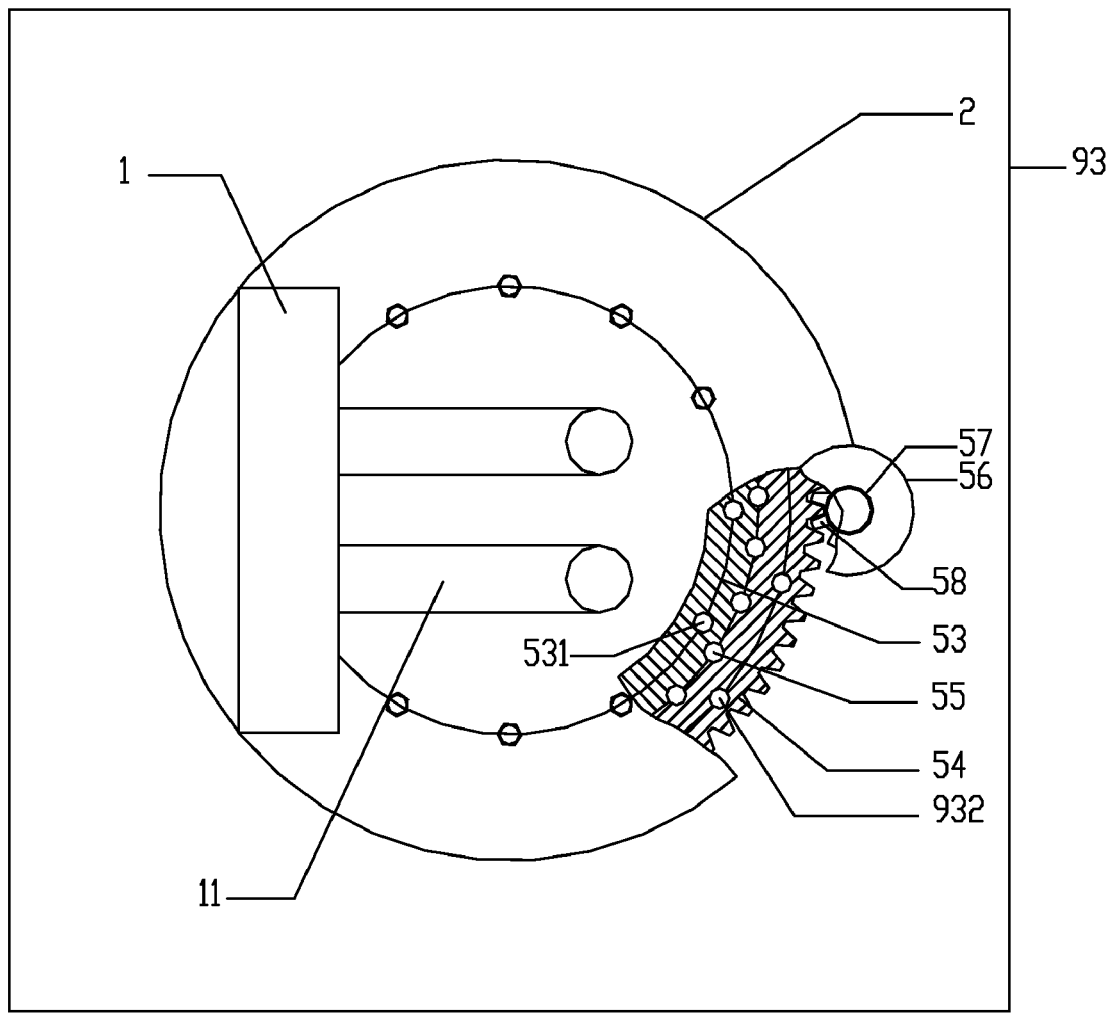
FIG. 3 is a top view of a swing-type submersible hollow shaft motor according to one embodiment of the invention.

As shown in FIGS. 1-3, the swing device comprises a swing bearing 52, a speed reducer 56 having a shaft 57, a fixed seat 93 and a bridge 92. The swing bearing 52 comprises an inner ring 53, an outer ring 54, and a steel ball 55 connected therebetween.

The base 2 is fixed to the inner ring 53 via a first bolt 531, and the support tube 4 passes through the inner ring 53.

The outer ring 54 is fixed to the fixed seat 93 via a second bolt 932.

The fixed seat 93 is fixed to the bridge 92 via a third bolt 931. In this embodiment, the bridge 92 is made of channel steel.

The speed reducer 56 is fixed to the edge of the base 2 via a fourth bolt 933.

A gear 58 is disposed on the shaft 57 of the speed reducer 56, and is engaged with the outer ring 54.

The operational principle of the swing device illustrated in FIG. 2 is as follows: turning on a plurality of the steel balls 55, the inner ring 53 swings in a clockwise or a counterclockwise direction. Since the base 2 is fixed to the inner ring 53 and the speed reducer 56 is connected to the support tube 4, when the shaft 57 of the speed reducer 56 rotates and the gear 58 operates along the outer ring 54, the speed reducer 56 forces the base 2, the support 4 and the inner ring 53 to swing in a clockwise or a counterclockwise direction during operation of the gear 58.

Figure 4A:
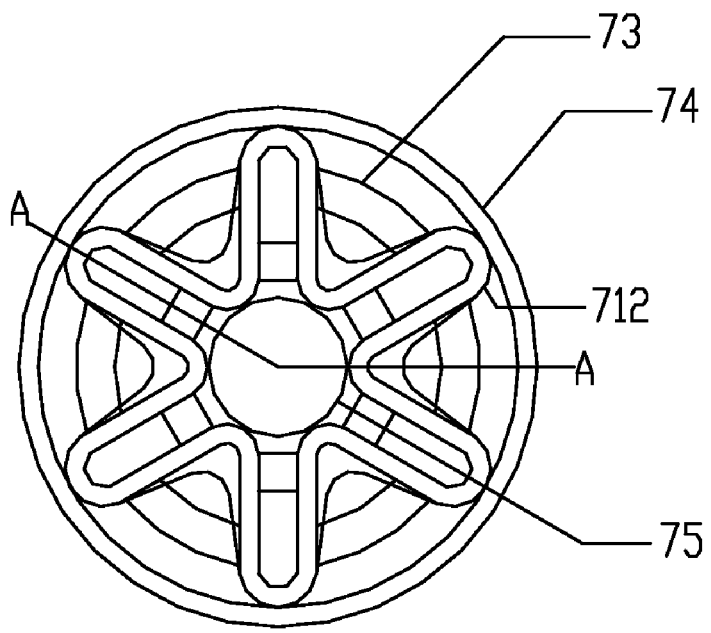
FIG. 4a is a front view of a rotary lobed duct according to one embodiment of the invention.
Figure 4B:
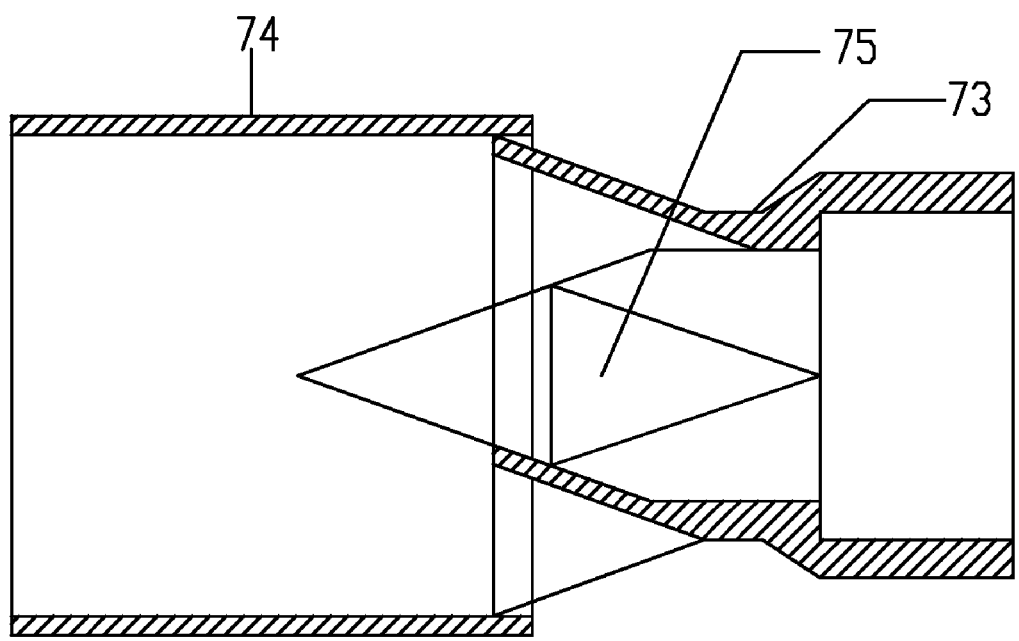
FIG. 4b is a sectional view of the rotary lobed duct in FIG. 4a along the line A-A.

As shown in FIGS. 4a and 4b, the propeller 72 comprises a hub and three blades; and the rotary lobed duct 71 comprises a rotary lobed nozzle 73, a mixing duct 74, and a center cone 75. The top of the rotary lobed nozzle 73 is connected to the propeller 72, and the rotary lobed duct 71 rotates along with the propeller 72 under the driving of the shaft 62. One end of the center cone 75 is received in the mixing duct 74, and the other end thereof is received in the rotary lobed nozzle 73. In this embodiment, the center cone 75 is fusiform. The mixing duct 74 is connected to the end of the rotary lobed nozzle 73.

The operational principle of the rotary lobed duct 71 is as follows. Gas compressed by the gas-ring compressor 1 is considered the main stream, and liquid in the vicinity of the rotary lobed duct 71 is considered the secondary stream. On the outlet section of the rotary lobed nozzle 73, the velocity of the main stream has an outward cross-stream component along the lobe peaks, and the velocity of the secondary stream has an inward cross-stream component along the lobe troughs. Thus, a transverse circulation flow is generated between the main stream (gas flow) and the secondary stream (water flow), and operates to improve viscous shear mixing between the liquid and the gas. Therefore, the mixing duct 74 of the rotary lobed duct 71 is capable of implementing adequate mixing of gas and liquid along a shorter length. Moreover, the use of the center cone 75 increases the cross section ratio of the mixing duct 74, and therefore increases the flow ratio of ejection.

The electric slip ring 8 is concentric with the swing bearing 52, so that a first leader cable 61 of the submersible hollow shaft motor 6, a second leader cable 12 of the gas-ring compressor 1, a third leader cable 561 of the driving device, and a fourth leader cable 81 connected to a main power supply can swing freely.

The operational principle of the swing-type submersible floating aerator is as follows. Compressed air processed by the air outlet opening 11 flows into the liquid via the pipe 3, the concentric reducer 31, the shaft 62 of the submersible hollow shaft motor 6, is mixed with the liquid entering the rotary lobed duct 71, and then ejected to form liquid-gas mixture. With stirring and push-flow by the propeller 72, the liquid-gas mixture disperses to a deeper and wider region, and thus deep-water aeration is realized. Moreover, the swing device forces the base 2 to rotate, and the swing-type submersible floating aerator to swing. Thus, push-flow and aeration in any direction is facilitated.

Figure 5:
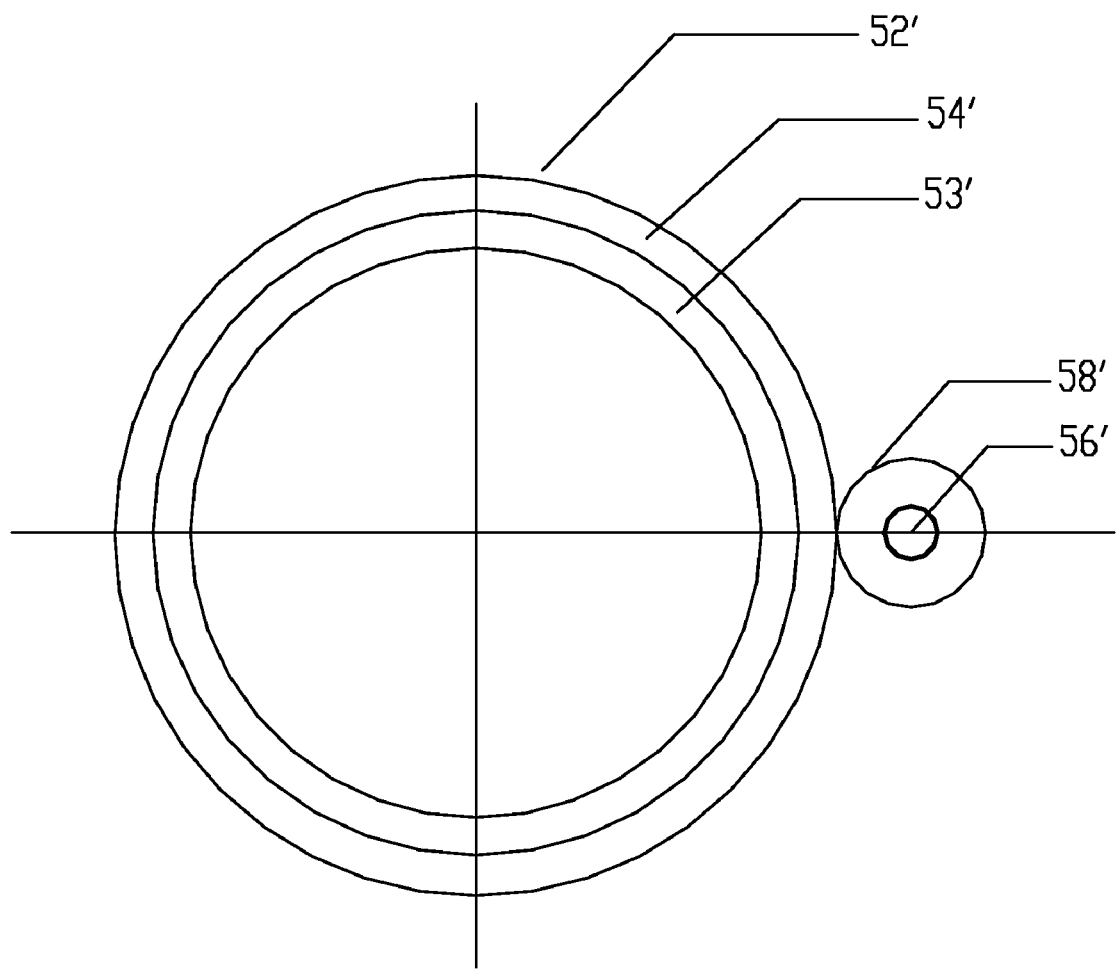
FIG. 5 illustrates a swing device according to another embodiment of the invention.

As shown in FIG. 5, the driving device is disposed on the fixed seat 93, and drives the swing device to rotate. The driving device comprises a motor 56' and a driving wheel 58'. The inner ring 53' of the swing device is fixed to the fixed seat 93, and the outer ring 54' is fixed to the base 2 and abuts against the driving wheel 58' of the driving device.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A swing submersible floating aerator, comprising
    a gas-ring compressor (1);
    a base (2);
    a pipe (3);
    a support tube (4);
    a swing device; and
    a driving device for driving said swing device to rotate;
    wherein
    said base (2) is disposed between said gas-ring compressor (1) and said support tube (4); and
    said base (2) is disposed at the center of said swing device.

2. The aerator of claim 1, wherein said swing device comprises a swing bearing (52); a speed reducer (56) having a shaft (57); a bridge (92); and a fixed seat (93) disposed on said bridge (92).

3. The aerator of claim 2, wherein said swing bearing (52) comprises an inner ring (53), an outer ring (54), and a plurality of steel balls (55) disposed between said inner ring (53) and said outer ring (54).

4. The aerator of claim 3, wherein
    a gear (58) is disposed on said shaft (57) of said speed reducer (56); and
    said gear (58) is engaged with said outer ring (54).

5. The aerator of claim 3, wherein
    said driving device is disposed on said base (2);
    said base (2) is disposed on said inner ring (53) of said swing bearing (52); and
    said outer ring (54) of said swing bearing (52) is disposed on said fixed seat (93), and engaged with said driving device.

6. The aerator of claim 3, wherein
    said driving device is disposed on said fixed seat (93);
    said driving device comprises a motor (56') and a driving wheel (58');
    said inner ring (53') is disposed on said fixed seat (93);
    said outer ring (54') is disposed on said base (2), and abuts against said driving wheel (58').

7. The aerator of claim 2, further comprising a propeller assembly comprising a rotary lobed duct (71) and a propeller (72).

8. The aerator of claim 7, further comprising a submersible hollow shaft motor (6) connected to an end of said pipe (3).

9. The aerator of claim 8, further comprising an electric slip ring (8).

10. The aerator of claim 9, wherein
    an end of said electric slip ring (8) is fixed to said gas-ring compressor (1);
    said electric slip ring (8) is concentric with said swing bearing (52) so that a first leader cable (61) of said submersible hollow shaft motor (6), a second leader cable (12) of said gas-ring compressor (1), a third leader cable (561) of said driving device, and a fourth leader cable (81) connected to a main power supply can each swing freely.

11. The aerator of claim 9, wherein
    a shaft (62) of said submersible hollow shaft motor (6) is hollow;
    a lower shaft extension of said shaft (62) is coaxially connected to said propeller assembly; and
    said submersible hollow shaft motor (6) is connected to the bottom of said support tube (4) via a connecting bracket (42).

12. The aerator of claim 11, wherein
    said propeller (72) comprises a hub and three blades;
    said rotary lobed duct (71) comprises a rotary lobed nozzle (73), a mixing duct (74), and a center cone (75);
    said rotary lobed nozzle (73) is connected to said propeller (72); and
    said rotary lobed duct (71) is rotatable along with said propeller and drivable by said shaft (62).

13. The aerator of claim 12, wherein
    a tie rod (68) is disposed in the vicinity of said support tube (4);
    the top of said tie rod (68) is connected to said base (2); and
    the bottom of said tie rod (68) is connected to said connecting bracket (42).

14. The aerator of claim 2, further comprising an electric slip ring (8).

15. The aerator of claim 2, further comprising a raincover (9) disposed at the top of the aerator and having a raincover support (91).

16. The aerator of claim 15 wherein the bottom of said raincover support (91) is connected to said fixed seat (93).

17. The aerator of claim 1, wherein a stiffener (41) is disposed between said support tube (4) and said base (2).

* * * * *